United States Patent [19]

Tabalba

[11] 3,899,643

[45] Aug. 12, 1975

[54] TELEPHONE SUBSET CIRCUIT

[75] Inventor: Camilo Manansala Tabalba, Harlow, England

[73] Assignee: International Standard Electric Corporation, New York, N.Y.

[22] Filed: July 30, 1973

[21] Appl. No.: 383,735

[30] Foreign Application Priority Data

Aug. 22, 1972 United Kingdom ............... 39083/72

[52] U.S. Cl. .............................................. 179/81 B

[51] Int. Cl. ............................................ H04m 1/60

[58] Field of Search ......... 179/81 A, 81 B, 170 NC, 179/170.8, 1 HF

[56] References Cited

UNITED STATES PATENTS

| | | | |
|---|---|---|---|
| 3,592,971 | 7/1971 | Cowpland | 179/81 A |
| 3,602,648 | 8/1971 | Holtz | 179/81 A |
| 3,789,155 | 1/1974 | Fensom | 179/81 A |
| 3,823,273 | 7/1974 | Beeman et al. | 179/81 B |

*Primary Examiner*—Kathleen H. Claffy
*Assistant Examiner*—Joseph Popek
*Attorney, Agent, or Firm*—John T. O'Halloran; Menotti J. Lombardi, Jr.; Alfred C. Hill

[57] ABSTRACT

This relates to a telephone subset circuit including circuitry for two-way speech over a two wire telephone line having automatic gain control (AGC) and noise reduction control for a transmit speech amplifier, line loss regulation for transmit and receive speech amplifiers and a line-subset hybrid. The line-subset hybrid, receive speech amplifier, transmit speech amplifier, AGC circuit and line loss regulation circuit are all provided by semiconductor circuitry on a single semiconductor chip. These circuits do not need any coils such as are usually used, for instance, in the hybrid.

18 Claims, 11 Drawing Figures

Fig. 1.

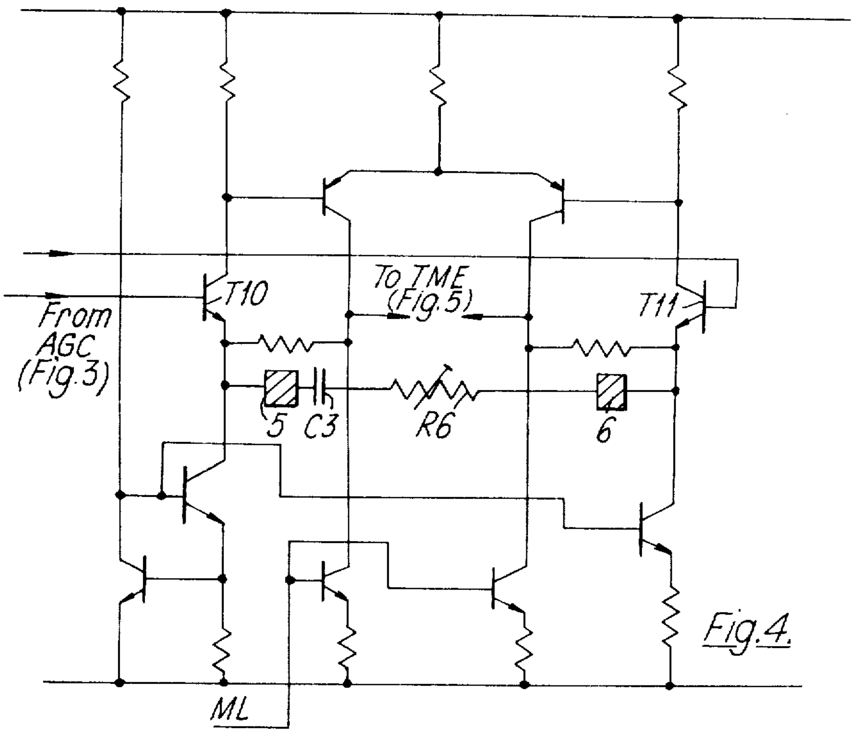
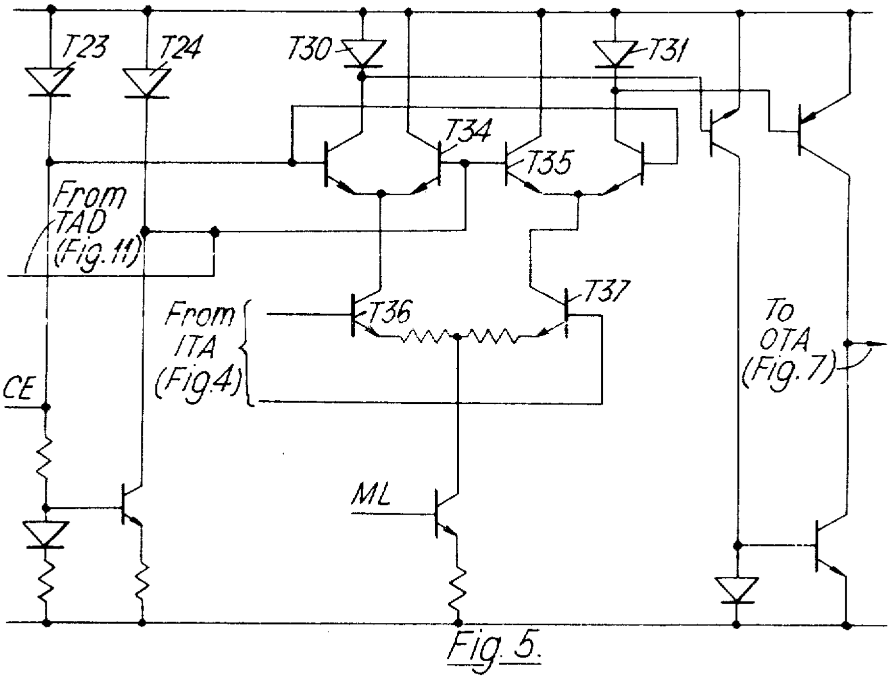
Fig.5.

TELEPHONE SUBSET CIRCUIT

BACKGROUND OF THE INVENTION

This invention relates to an electronic circuit for use in a telephone subscriber's instrument for connecting both the microphone and the telephone earpiece receiver to a two-wire telephone line having the usual characteristics of such a line.

SUMMARY OF THE INVENTION

An object of the invention is to avoid the use of the heavy and expensive coils which are present in a conventional telephone subscriber's instrument.

A feature of the present invention is the provision of an electronic circuit for use in a telephone subscriber's instrument having a microphone and a receiving transducer comprising: first amplification means for coupling the microphone to a two-wire telephone line coupled to a telephone exchange; automatic gain control means coupled to the microphone and the first amplification means; second amplification means for coupling the line to the receiving transducer; voltage regulator means coupled to the line and the first and second amplification means, the voltage regulator means being responsive to line conditions of the line to adjust both of the first and second amplification means according to the line conditions; and additional circuit means coupled to the first and second amplification means and the line to couple the output of the first amplification means and the input of the second amplification means to the line.

In the embodiment of the invention to be described herein, the entire circuitry for a telephone subscriber's instrument, apart from what is needed for ringing and dialling (or key-sending), uses transistorized circuit units in which no coils and inductors are used. This circuitry is produced on a single semiconductor chip.

BRIEF DESCRIPTION OF THE DRAWING

Above-mentioned and other features and objects of this invention will become more apparent by reference to the following description taken in conjunction with the accompanying drawing, in which:

FIGS. 2 to 11 are schematic diagrams illustrating in more detail various blocks of the electronic circuit of FIG. 1.

DESCRIPTION OF THE PREFERRED EMBODIMENT

Figure 1:
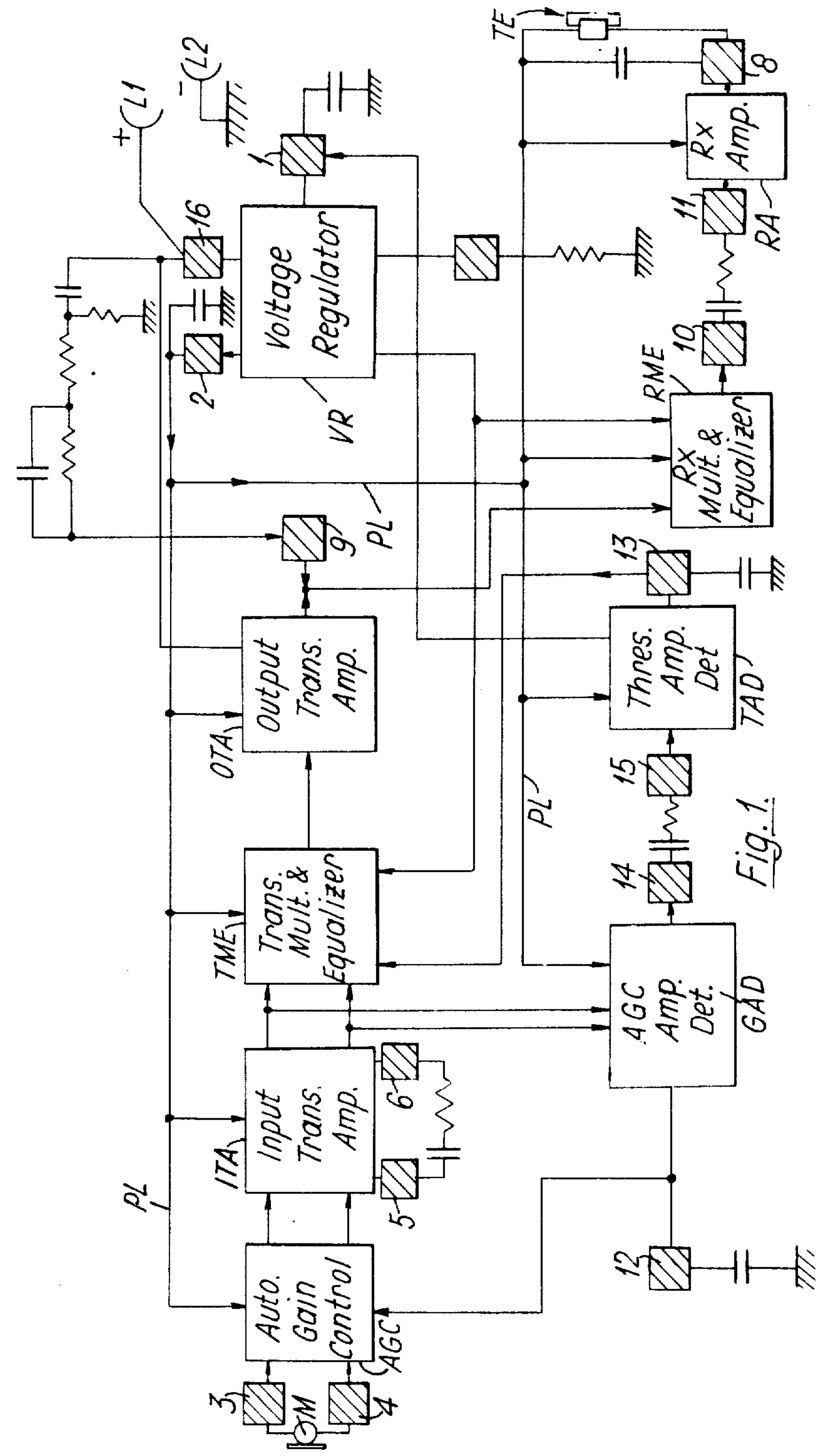
FIG. 1 is a block and schematic diagram of an electronic circuit for a telephone subscriber's instrument according to the principles of the present invention.

The Block Diagram (FIG. 1)

The circuit is assembled, as already mentioned, on a single semiconductor chip, so that it is an example of Medium-Scale-Integration (MSI). It is assembled in a dual-in-line package (DIP), and the shaded and numbered squares represent the terminals of the DIP. The ground symbol is also a terminal of the DIP. The discrete electrical components indicated, all of which (other than the microphone M and the telephone earpiece (receiving transducer) TE which are connected externally to the DIP) are resistors or capacitors. Of the terminals of the DIP, terminal 16 and the ground terminal are connected to the line terminals, shown in FIG. 1 as L1 and L2. The line terminals must have the correct polarity as indicated.

The microphone M is connected to terminals 3 and 4 of the DIP, which are connected to an automatic gain control circuit AGC via which the speech input reaches the input transmission amplifier ITA. Amplifier ITA, like the other blocks in FIG. 1, is powered from the exchange via a voltage regulator VR by its output coupled to terminal 2 which in turn is coupled to conductor PL. Regulator VR, as will be seen below, includes means whereby the control signals to the various units depends on the line loss conditions, so that the amplification provided both for outgoing and for incoming speech is increased if the line is a long one, which is indicated by low line current.

Amplifier ITA has two-wire inputs and outputs (as will be seen much use is made of long-tailed pairs and similar circuitry), and feeds another amplifier TME, the Transmission Multiplier and Equalizer. Amplifier TME is controlled from the voltage regulator VR to provide the adjustment needed to cater for varying line conditions. Amplifier TME drives the Output Transmission Amplifier OTA, which has two outputs, one to the Receiving Multiplier and Equalizer RME to provide some side-tone (also connected to DIP terminal 9) and the other terminal 16, and therefrom to terminal L1 of the line. An RC circuit is connected between terminals 9 and 16 to couple input signal from line L1 to the input of multiplier and equalizer RME.

Moving back along the transmission "chain", amplifier ITA, which has an RC circuit connected between its terminals 5 and 6 (see below), has a second output leading to an Automatic Gain Control Amplifier/Detector GAD, which is also controlled from automatic gain control circuit AGC, and which feeds a Threshold Amplifier Detector TAD via terminal 14, an RC circuit, and terminal 15. The output of detector TAD also extends to amplifier TME via terminal 13 and this enhances the automatic gain control on the outgoing speech whenever the speech level is above a level assumed to be normal ambient room noise.

Speech signals incoming to the instrument appear between the line terminals L1 and L2, and, thus, are applied via terminal 16, the RC filter-network and terminal 9 to amplifier RME mentioned above, which feeds the reception amplifier RA via terminal 10, another RC circuit and terminal 11. Amplifier RA drives the telephone earpiece TE, which is connected in shunt with a capacitor connected between terminals 8 and 2.

The various circuit units shown separately in FIGS. 2 to 11 will now be described briefly.

Figure 2:
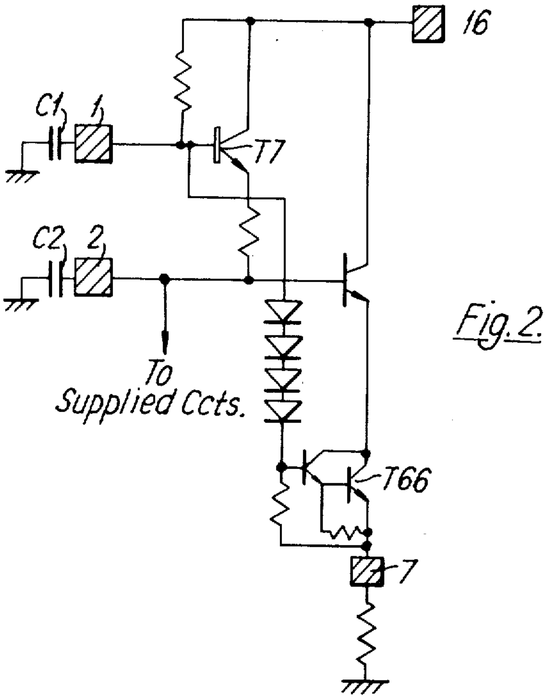

The Voltage Regulator VR (FIG. 2).

This is essentially a shunt-type power supply, with a low impedance, about 10 ohms, between pin 16 and ground. This impedance increases with the speech frequency and becomes 820 ohms at the highest frequencies, when the impedance of the capacitor C1, which is 200 $\mu$F, approaches zero. The other capacitor C2 is 1000 $\mu$F. A stabilized voltage is obtained from the emitter of transistor T7 which is approximately 5 times the $V_{BE}$ of a transistor, i.e., about 3 volts, and this feeds the circuit elements connected to the emitter of transistor T7 via a small resistor. Because the stabilized voltage is obtained from $V_{BE}$, this stabilized voltage has a negative temperature coefficient of about 0.3% per degree C. The voltage supply changes with line length and is caused by additional voltage drop on the 10-ohm resistor between terminal 7 and ground.

Note that the diodes shown in FIG. 2 are produced on the chip by making transistors each with its base and collector connected together.

Figure 3:
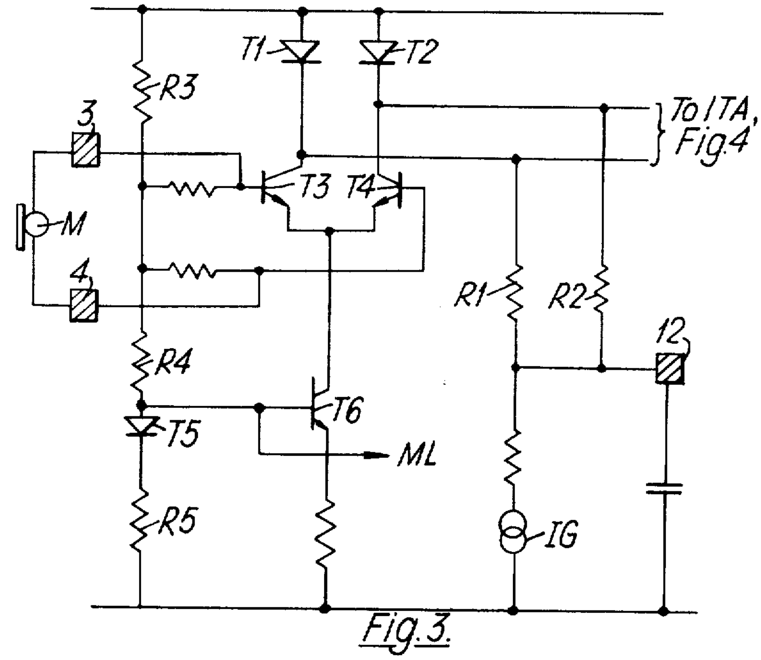

Automatic Gain Control Circuit AGC (FIG. 3).

Figure 10:
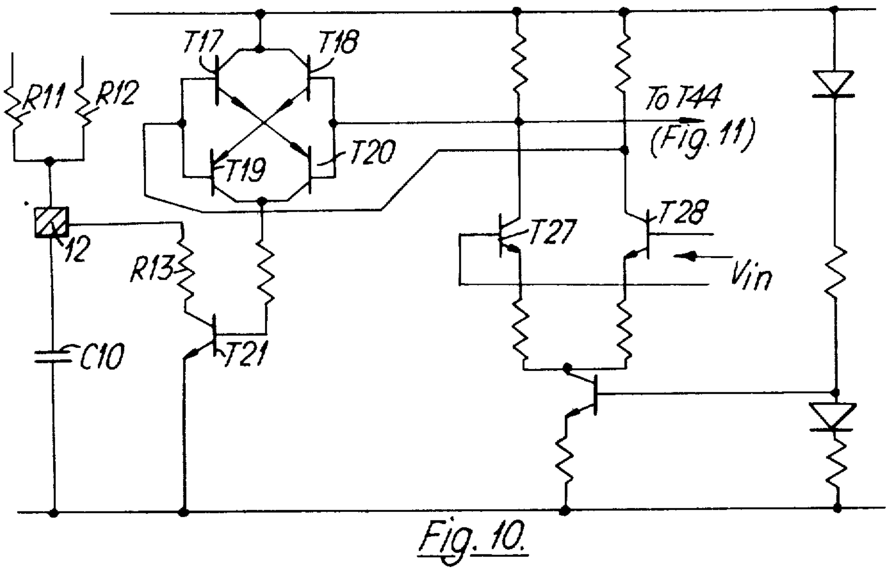

This circuit is based on a long-tailed pair, the "pair" transistors being transistors T3 and T4. The current generator IG consists of a transistor circuit and when it is open circuited, in which case the current in the equal-valued resistors R1 and R2 is zero, the circuit has unity gain. As will be described below, the current generator is controlled by the AGC amplifier (FIG. 10). The circuit has a decreasing gain as the current in IG increases.

The base input of transistor T6, which forms part of the common emitter load of transistors T3 and T4, is controlled from the potential divider resistor R3, resistor R4, diode T5 and resistor R5, connected across the supply, and this divider also provides a controlling bias for certain other circuit units as indicated at ML.

Input Transmission Amplifier ITA (FIG. 4).

This has double inputs and double outputs, and can be adjusted by suitable choice of the resistor R6 connected between the emitters of transistors T10 and T11, to the bases of which the inputs are connected. This resistor is usually set to have a value of 130 ohms, which gives the amplifier a suitable level of feedback for stability. The capacitor C3 in series with R6 permits the attainment of an unitary differential gain in the direct current characteristic, which provides the necessary degree of direct current balance of the output. ML represents the connection to the potential divider of FIG. 3, already mentioned.

Transmission Multiplier TME (FIG. 5).

This increases the transmission gain when the input signal level passes a fixed threshold value, the circuit being controlled from the threshold detector TAD (FIG. 11) as indicated. The circuit is also used for the cable equalization in the transmission. This is indicated by the connection CE from a potential divider.

The audio signal is applied from the outputs of the input transmission amplifier ITA (FIG. 4) to the bases of transistors T36 and T37, and appears at the output, amplified by a factor K, dependent on the ratio between the currents flowing in the diodes T23 and T24.

It will be seen that when the current in diode T24 increases by a certain amount, transistors T34 and T35 are switched off. These transistors when conducting "bleed off" some of the signal, so that by switching them off or by reducing their levels of conductivity, the signal loss through them is reduced. Thus, the gain of the stage is increased to this extent.

The signal reaches the next stage amplifier OTA via the further transistors shown including transistors T34 and T35, dependent on the currents in the diodes T30 and T31.

Figure 6:
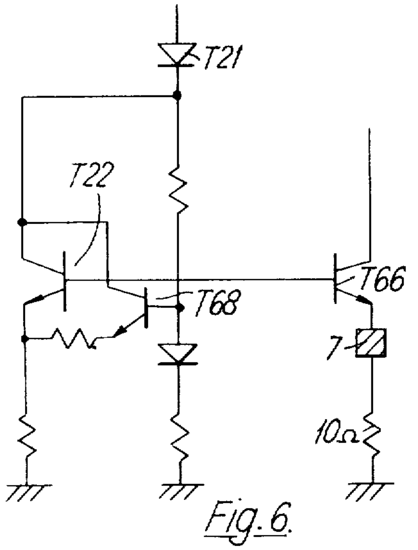

The amplification chain has to reduce its gain when the line length decreases since line losses are then relatively low. This calls for a reduction in the current which flows in diode T23, using the circuit connected to CE, and which is shown in FIG. 6. This is controlled by the voltage present on the 10 ohm resistor connected between terminal 7 and ground (see FIG. 2), since this voltage varies inversely with the length of the line. The transistor T68, FIG. 6, is included to reduce the gain somewhat for the longest lines. In such a case it is found that there is a risk that the gain is too high. Hence, this transistor, in effect, inserts itself into the circuit when the voltage on the emitter resistor of transistor T22 is small, which is the case for a long line.

Thus, the gain, and the output signal amplitude, are maintained within acceptable limits.

Figure 7:
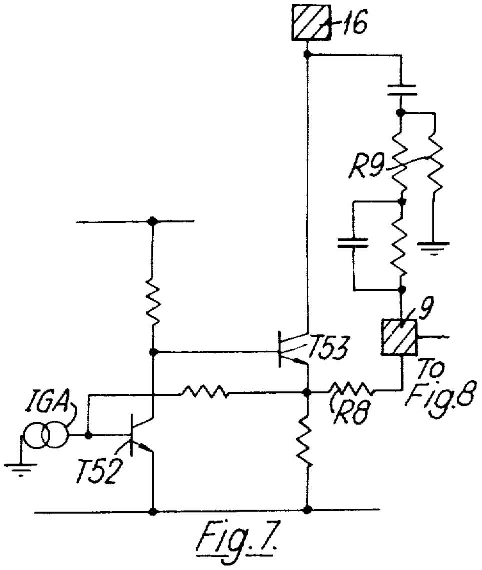

Output Transmission Amplifier OTA (FIG. 7).

The last transistor in the transmission chain, which is T53 has to supply a signal maximum of about 1 volt R.M.S. to its load in every condition of line length. Knowing that the output impedance of the circuit is large enough to provide adequate side tone with a short line, then a standby current of about 10 mA is needed. Therefore T53 is biassed so that its emitter voltage is at $V_{BE}$ for transistor T52. This latter has its base driven by a current generator IGA, which is a transistor circuit. As the signal is received from TME (FIG. 5), the variations likely in the emitter voltage of T53, and thus in the standby current is of the order of ± 10%, due to the offset current of TME.

Balancing of the transmitting and receiving signals is effected at the transistor T53. In fact, the receiver signal is at terminal 9, attenuated by the value of the ratio between the external network which interconnects terminals 9 and 16 and the resistor R8. The transmission signal does not appear at this point as it is the algebraic sum of the emitter and collector signals of T53, which are in phase opposition. The transmission signal reaches the line, of course via terminal 16.

The resistor R9, which in one case has a value of 1.3K ohm, is inserted to reduce the output impedance to a level such as to guarantee 10 dB of return loss at zero line resistance terminated in 600 ohms.

Figure 8:
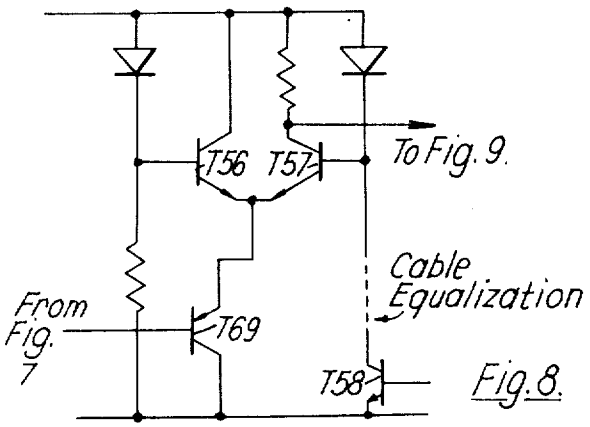

Receiver Multiplier RME (FIG. 8).

The receive signal from terminal 9 (FIG. 7) is applied to the base of transistor T69 whose emitter is coupled to the emitters of transistors T56 and T57. Transistor T69 prevents the absorption by the multiplier of standby current due to transistor T53 (FIG. 7), to the detriment of the multiplier. The multiplier is of the variable admittance type, but with shift of the output amplitude of the direct current. With a long line, the current is not drained from transistor T58, all of the signal then passing effectively to the collector circuit of transistor T57, while as the line length decreases current in transistor T58 causes transistor T56 to absorb some fraction of the signal.

Figure 9:
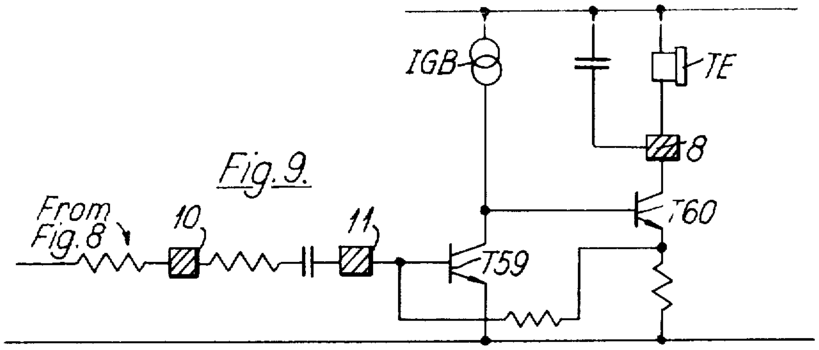

The capacitor between terminals 10 and 11 (see FIG. 9) provides D.C. separation between the circuits shown in FIGS. 8 and 9, which is needed since the gain variations are accompanied by alterations in D.C. level.

Receiver Amplifier RA (FIG. 9).

This includes two transistors T59 and T60 cascaded in a relatively conventional way, the collector circuit of transistor T59 including a current generator IGB, which can be a transistor whose emitter-collector path is suitably controlled via its base. The biasing of the second stage transistor T60 so that it amplifies the signal being supplied to the transducer TE is derived from the $V_{BE}$ of transistor T59. Hence, it can have a stand-by current of about 2 mA, which is adequate to ensure its dynamic range in all ambient conditions likely to be encountered. The current generator IGB ensures that the circuit has a high open circuit gain and has a good value of feedback. This latter is desirable in the interests of stability.

AGC Amplifier and Detector GAD (FIG. 10).

This is a differential amplifier whose input $V_{in}$ to the bases of transistors T27 and T28 comes from the output of the amplifier ITA (FIG. 4), and it is a fixed-gain amplifier. It applies its output to the bases of four transistors T17–T20, which work in class C. These four transistors form the peak detector of the AGC circuitry, since when the output differential voltage of transistors T27 and T28 exceeds 2 $V_{BE}$, the detector supplies an impulsing current. This is filtered by a capacitor C10, and is applied via resistors R11 and R12 to the input amplification circuitry described above.

The capacitor C10 is charged by a relatively small signal to the voltage of the cathodes of the diodes T1 and T2, FIG. 3. The increase in the signal renders transistor T21 conductive, which causes the discharge of C10 with a time constant defined by its own value, 50$\mu$F, and resistor R13, of 430 ohms. After the signal level reduction due to the AGC, C10 charges again, this time through the 2.7 K ohm resistors R11 and R12, which being in parallel have an effective resistance of 1.35 K ohm, so the recovery time constant is three times as long as the discharging time constants.

Figure 11:
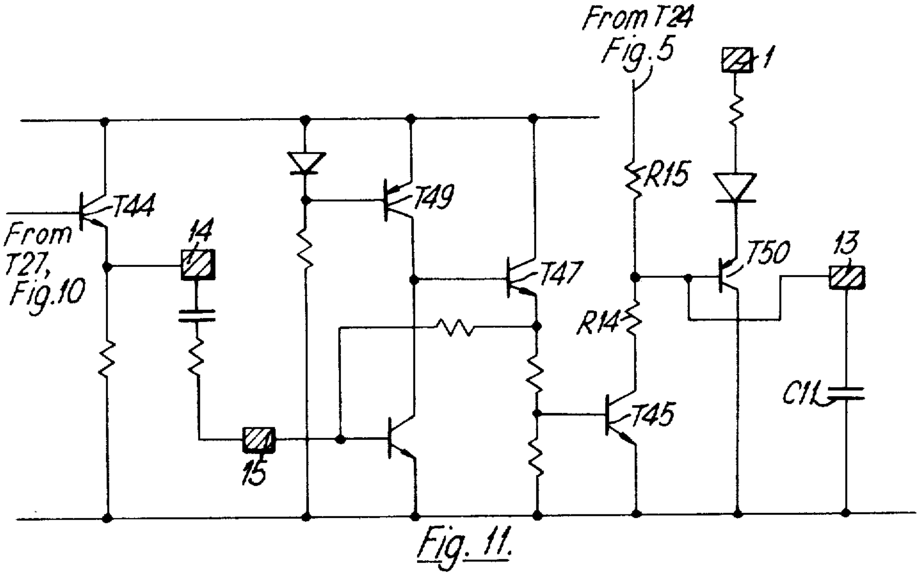

Threshold Amplifier and Detector TAD (FIG. 11).

The output of the AGC amplifier, obtained from the collector of transistor T27 (FIG. 10) is passed via an emitter follower transistor T44 to the threshold amplifier and detector. The interface threshold can be altered by alteration of the resistor between the terminals 14 and 15, which is an external resistor. The amplifier includes a transistor T49 which acts as a current generator to increase gain at opened circuit, while the standby voltage to the emitter of the amplifier transistor T47 is equal to $V_{BE}$. Therefore, the detector transistor T45 is biassed to class C operating condition, and only when the input signal passes the threshold does transistor T45 conduct, which increases the multiplication constant of the output amplifier. The time constants for the commencement and the recovery are defined by capacitor C11 and resistors R14 and R15. At this time, the D.C. output operates transistor T50, and the latter increases the supply voltage at pin 16 of the DIP (FIG. 1). This is necessary to transmit into the line signal with high amplitude.

While I have described above the principles of my invention in connection with specific apparatus it is to be clearly understood that this description is made only by way of example and not as a limitation to the scope of my invention as set forth in the objects thereof and in the accompanying claims.

I claim:

1. An electronic circuit for use in a telephone subscriber's instrument having a microphone and a receiving transducer comprising:

first amplification means for coupling said microphone to a two-wire telephone line coupled to a telephone exchange and to provide a side tone;

automatic gain control means coupled to said microphone and said first amplification means;

second amplification means for coupling said line to said receiving transducer;

voltage regulator means coupled to said line and said first and second amplification means, said voltage regulator means being responsive to line conditions of said line to adjust the gain of both of said first and second amplification means according to said line conditions;

a first conductor coupled between said first amplification means and said second amplification means to provide said side tone for said receiving transducer to enable a subscriber to hear in said receiving transducer what is leaving said instrument;

a second conductor to couple an output of said first amplification means to one wire of said line; and a resistor-capacitor filter network coupled between one wire of said line and the input of said second amplification means, said filter network conducting therethrough an equal value of output signal from said first amplification means in phase opposition thereby leaving only said side tone and an input signal from said telephone line to be coupled to said second amplification means.

2. An electronic circuit according to claim 1, wherein said first and second amplification means, said automatic gain control means and said voltage regulator means are integrated circuitry formed on a single semiconductor chip.

3. An electronic circuit according to claim 2, wherein said first and second amplification means, said automatic gain control means, said voltage regulator means and said filter network include only transistors, semiconductor diodes, resistors and capacitors.

4. An electronic circuit according to claim 2, wherein said line is coupled to said chip by a pair of terminals formed in said chip.

5. An electronic circuit according to claim 4, wherein said filter network is disposed externally of said chip connected to one of said pair of terminals and connected to an additional terminal formed in said chip, said additional terminal being connected to the output of said first amplification means and the input of said second amplification means.

6. An electronic circuit for use in a telephor sub-scriber's instrument having a microphone and a ceiving transducer comprising:

a first pair of terminals to which a two-wire te lephone line is connected when said electronic ci.cuit is in use and over which power for said electronic circuit is supplied;

a second pair of terminals to which said microphone is connected when said electronic circuit is in use;

automatic gain control means coupled to said second pair of terminals to receive speech from said microphone;

first amplification means coupled to said gain control means and providing a side tone;

a voltage regulator connected to said first pair of terminals responsive to the level of current on said line when said electronic circuit is in use, said voltage regulator having a first output connection and a second output connection;

said first output connection coupling said regulator to said first amplification means to enable the gain of said first amplification means to be adjusted in accordance with the level of said line current;

a first output from said first amplification means coupled to one of said first pair of terminals and hence to said line when said electronic circuit is in use;

a third pair of terminals to which said receiving transducer is connected when said electronic circuit is in use;

second amplification means having its input connected to said one of said first pair of terminals and its output connected to said third pair of terminals when said electronic circuit is in use;

said second and third pair of terminals being isolated from each other by said first and second amplification means;

said second output connection coupling said regulator to said second amplification means to enable to gain of said second amplification means to be adjusted in accordance with the level of said line current; and a second output from said first amplification means coupled to said second amplification means to couple said side tone to said second amplification means and hence to said receiving transducer to enable a subscriber to hear in said receiving transducer what is leaving said instrument.

7. An electronic circuit according to claim 6, wherein said automatic gain control means, said first and second amplification means, said voltage regulator, said first and second connections and said first and second outputs are integrated circuitry formed on a single semiconductor chip, and said first, second and third pair of terminals are formed in said chip.

8. An electronic circuit according to claim 7, wherein said automatic gain control means, said first and second amplification means and said voltage regulator include only transistors, semiconductor diodes, resistors and capacitors.

9. An electronic circuit according to claim 6, further including a resistor-capacitor filter network connected between said one of said first pair of terminals and said second output of said first amplification means, said filter network having an equal value of output signal from said first amplification means in phase opposition therein and an input signal from said telephone line to said second amplification means therein thereby leaving only said side tone and said input signal for coupling to said second amplification means.

10. An electronic circuit according to claim 9, wherein said automatic gain control means, said first and second amplification means, said voltage regulator and said first and second outputs are integrated circuitry formed on a single semiconductor chip, and said first, second and third pair of terminals are formed in said chip, said resistor-capacitor filter network, said microphone and said receiving transducer being disposed externally of said chip.

11. An electronic circuit according to claim 9, further including a gain control detection means coupled to said automatic gain control means and said first amplification means controlled by both said automatic gain control means and said first amplification means to enhance gain control of said first amplification means when speech level exceeds a specified value.

12. An electronic circuit according to claim 11, wherein said first amplification means is a chain of three amplifiers with said gain control being exerted on the second amplifier of said chain.

13. An electronic circuit according to claim 11, wherein said automatic gain control means, said first and second amplification means, said voltage regulator, said first and second outputs and said gain control detection means are integrated circuitry formed on a single semiconductor chip, and said first, second and third pair of terminals are formed in said chip, said resistor-capacitor filter network, said microphone and said receiving transducer being disposed externally of said chip.

14. An electronic circuit according to claim 13, wherein said automatic gain control means, said first and second amplification means, said voltage regulator and said gain control detection means include only transistors, semiconductor diodes, resistors and capacitors.

15. An electronic circuit according to claim 6, further including a gain control detection means coupled to said automatic gain control means and said first amplification means controlled by both said automatic gain control means and said first amplification means to enhance gain control of said first amplification means when speech level exceeds a specified value.

16. An electronic circuit according to claim 15, wherein said first amplification means is a chain of three amplifiers with said gain control being exerted on the second amplifier of said chain.

17. An electronic circuit according to claim 15, wherein said automatic gain control means, said first and second amplification means, said voltage regulator, said first and second outputs and said gain control detection means are integrated circuitry formed on a single semiconductor chip, and said first, second and third pair of terminals are formed in said chip, said microphone and said receiving transducer being disposed externally of said chip.

18. An electronic circuit according to claim 17, wherein said automatic gain control means, said first and second amplification means, said voltage regulator and said gain control detection means include only transistors, semiconductor diodes, resistors and capacitors.

* * * * *